US010654366B2

(12) United States Patent
Miro-Padovani et al.

(10) Patent No.: US 10,654,366 B2
(45) Date of Patent: May 19, 2020

(54) METHOD FOR MANAGING THE CHARGE STATE OF A TRACTION BATTERY OF A HYBRID VEHICLE

(71) Applicant: RENAULT s.a.s., Boulogne-Billancourt (FR)

(72) Inventors: Thomas Miro-Padovani, Maurepas (FR); Abdel-Djalil Ourabah, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 45 days.

(21) Appl. No.: 15/523,702

(22) PCT Filed: Nov. 2, 2015

(86) PCT No.: PCT/FR2015/052946
§ 371 (c)(1),
(2) Date: May 2, 2017

(87) PCT Pub. No.: WO2016/071615
PCT Pub. Date: May 12, 2016

(65) Prior Publication Data
US 2017/0334307 A1 Nov. 23, 2017

(30) Foreign Application Priority Data
Nov. 3, 2014 (FR) ...................... 14 60586

(51) Int. Cl.
*B60W 20/13* (2016.01)
*B60L 58/22* (2019.01)
(Continued)

(52) U.S. Cl.
CPC .......... *B60L 11/1861* (2013.01); *B60L 50/13* (2019.02); *B60L 58/12* (2019.02); *B60L 58/13* (2019.02);
(Continued)

(58) Field of Classification Search
CPC .............. B60L 11/1861; B60L 11/1862; B60L 11/1811; B60L 11/1872; B60L 11/1892;
(Continued)

(56) References Cited

U.S. PATENT DOCUMENTS 6,166,449 A 12/2000 Takaoka et al.
7,360,615 B2 * 4/2008 Salman ............... B60K 6/52
180/65.265
(Continued)

FOREIGN PATENT DOCUMENTS

EP 0 829 389 A2 3/1998
EP 2 177 389 A1 4/2010

OTHER PUBLICATIONS

International Search Report dated Jan. 29, 2016 in PCT/FR2015/052946 filed Nov. 2, 2015.
(Continued)

*Primary Examiner* — Hunter B Lonsberry
*Assistant Examiner* — Luis A Martinez Borrero
(74) *Attorney, Agent, or Firm* — Oblon, McClelland, Maier & Neustadt, L.L.P.

(57) ABSTRACT

A method for managing the charge state of a battery includes activating a float-charge phase of the battery, in which the battery is intermittently charged with a view to maintaining the charge state thereof above a predetermined target charge-state value. The method also includes detecting critical conditions of use of the battery likely to prevent the battery charge state from being maintained above the predetermined target charge-state value and increasing the predetermined target charge-state value when the critical conditions of use of the battery are detected, such as to anticipate activating the battery float-charge phase.

8 Claims, 1 Drawing Sheet

(51) Int. Cl.
| | |
|---|---|
| *B60L 58/13* | (2019.01) |
| *B60L 11/18* | (2006.01) |
| *B60W 10/06* | (2006.01) |
| *B60W 10/08* | (2006.01) |
| *B60W 50/00* | (2006.01) |
| *B60L 58/14* | (2019.01) |
| *B60L 58/12* | (2019.01) |
| *B60L 50/13* | (2019.01) |
| *B60W 20/00* | (2016.01) |

(52) U.S. Cl.
CPC .............. *B60L 58/14* (2019.02); *B60L 58/22* (2019.02); *B60W 10/06* (2013.01); *B60W 10/08* (2013.01); *B60W 20/00* (2013.01); *B60W 20/13* (2016.01); *B60W 50/0097* (2013.01); *B60L 2240/12* (2013.01); *B60L 2240/547* (2013.01); *B60L 2240/549* (2013.01); *B60W 2510/244* (2013.01); *Y02T 10/6291* (2013.01); *Y02T 10/7005* (2013.01); *Y02T 10/705* (2013.01); *Y02T 10/7044* (2013.01)

(58) Field of Classification Search
CPC .......... B60L 50/13; B60L 7/16; B60L 11/002; B60W 20/13
See application file for complete search history.

(56) References Cited

U.S. PATENT DOCUMENTS

| | | | | | |
|---|---|---|---|---|---|
| 8,731,752 | B2* | 5/2014 | Yu | ........................ | B60W 10/26 701/22 |
| 9,050,969 | B2* | 6/2015 | Yu | ........................ | B60W 10/06 |
| 9,079,581 | B1* | 7/2015 | Li | ........................ | B60W 10/06 |
| 9,428,075 | B2* | 8/2016 | Fukui | ........................ | B60L 3/00 |
| 9,570,978 | B2* | 2/2017 | Matsumoto | ............. | H02M 1/08 |
| 9,793,722 | B2* | 10/2017 | Tamura | ................. | B60R 16/033 |
| 9,868,434 | B2* | 1/2018 | Hisano | ................. | B60W 10/26 |
| 9,893,394 | B2* | 2/2018 | Shin | .................... | H01M 10/625 |
| 10,056,773 | B2* | 8/2018 | Sugeno | ................. | H02J 7/0052 |
| 2002/0113441 | A1 | 8/2002 | Obayashi | | |
| 2003/0094816 | A1* | 5/2003 | Kazama | .................... | B60K 6/32 290/400 |
| 2004/0084232 | A1* | 5/2004 | Obayashi | ................... | H02J 1/14 180/65.28 |
| 2004/0195017 | A1* | 10/2004 | Braun | ........................ | B60K 6/48 180/65.25 |
| 2005/0274553 | A1* | 12/2005 | Salman | .................... | B60K 6/52 180/65.28 |
| 2008/0197796 | A1* | 8/2008 | Bae | ........................ | B60L 15/025 318/432 |
| 2009/0015202 | A1* | 1/2009 | Miura | .................... | B60W 10/26 320/132 |
| 2010/0324765 | A1 | 12/2010 | Iida et al. | | |
| 2011/0166732 | A1* | 7/2011 | Yu | ........................ | B60W 10/26 701/22 |
| 2012/0072066 | A1* | 3/2012 | Kato | ...................... | B60K 6/365 701/22 |
| 2012/0176231 | A1 | 7/2012 | Skaff et al. | | |
| 2013/0057214 | A1* | 3/2013 | Stevens | ..................... | H02J 3/14 320/109 |
| 2013/0093393 | A1* | 4/2013 | Shimotani | ................. | B60L 3/12 320/109 |
| 2013/0211649 | A1* | 8/2013 | Tashiro | .............. | B60H 1/00735 701/22 |
| 2013/0264975 | A1* | 10/2013 | Kaita | .................. | B60L 15/2009 318/139 |
| 2013/0278225 | A1* | 10/2013 | Dietze | ..................... | H02J 7/045 320/137 |
| 2013/0332016 | A1* | 12/2013 | Suzuki | .................. | B60W 30/00 701/22 |
| 2013/0338862 | A1* | 12/2013 | Guerin | ................ | H01M 10/443 701/22 |
| 2014/0163789 | A1* | 6/2014 | Yu | ........................ | B60W 10/06 701/22 |
| 2014/0244225 | A1* | 8/2014 | Balasingam | ........ | G06F 17/5036 703/2 |
| 2014/0372019 | A1 | 12/2014 | Skaff et al. | | |
| 2015/0002105 | A1* | 1/2015 | Kelly | ................. | G01R 31/3648 320/162 |
| 2015/0202983 | A1* | 7/2015 | Le | ....................... | H01M 10/441 320/109 |
| 2015/0202984 | A1* | 7/2015 | Wyatt | ........................ | B60L 7/16 320/109 |
| 2015/0202985 | A1* | 7/2015 | Le | ........................... | B60L 50/64 307/9.1 |
| 2015/0239364 | A1* | 8/2015 | Baughman | ........... | G07C 5/0841 701/33.4 |
| 2015/0258908 | A1* | 9/2015 | Fukui | ........................ | B60L 3/00 320/162 |
| 2015/0267380 | A1* | 9/2015 | Kaneko | ..................... | B60K 6/46 701/22 |
| 2015/0280294 | A1* | 10/2015 | Shin | .................... | H01M 10/625 429/50 |
| 2015/0295448 | A1* | 10/2015 | Sugeno | ............. | H01M 10/4207 701/22 |
| 2015/0367838 | A1* | 12/2015 | Runde | .................... | B60W 10/26 701/22 |
| 2016/0089994 | A1* | 3/2016 | Keller | ..................... | H02J 7/045 320/153 |
| 2016/0159337 | A1* | 6/2016 | Hisano | .................. | B60W 10/26 701/22 |
| 2016/0185246 | A1* | 6/2016 | Paul | ..................... | B60L 11/1844 320/106 |
| 2017/0144561 | A1* | 5/2017 | Saint-Marcoux | ....... | B60L 50/16 |
| 2019/0344775 | A1* | 11/2019 | Ourabah | ............... | B60W 20/12 |

OTHER PUBLICATIONS

French Search Report dated Apr. 30, 2015 in French Application 1 460586 filed Nov. 3, 2014.

* cited by examiner

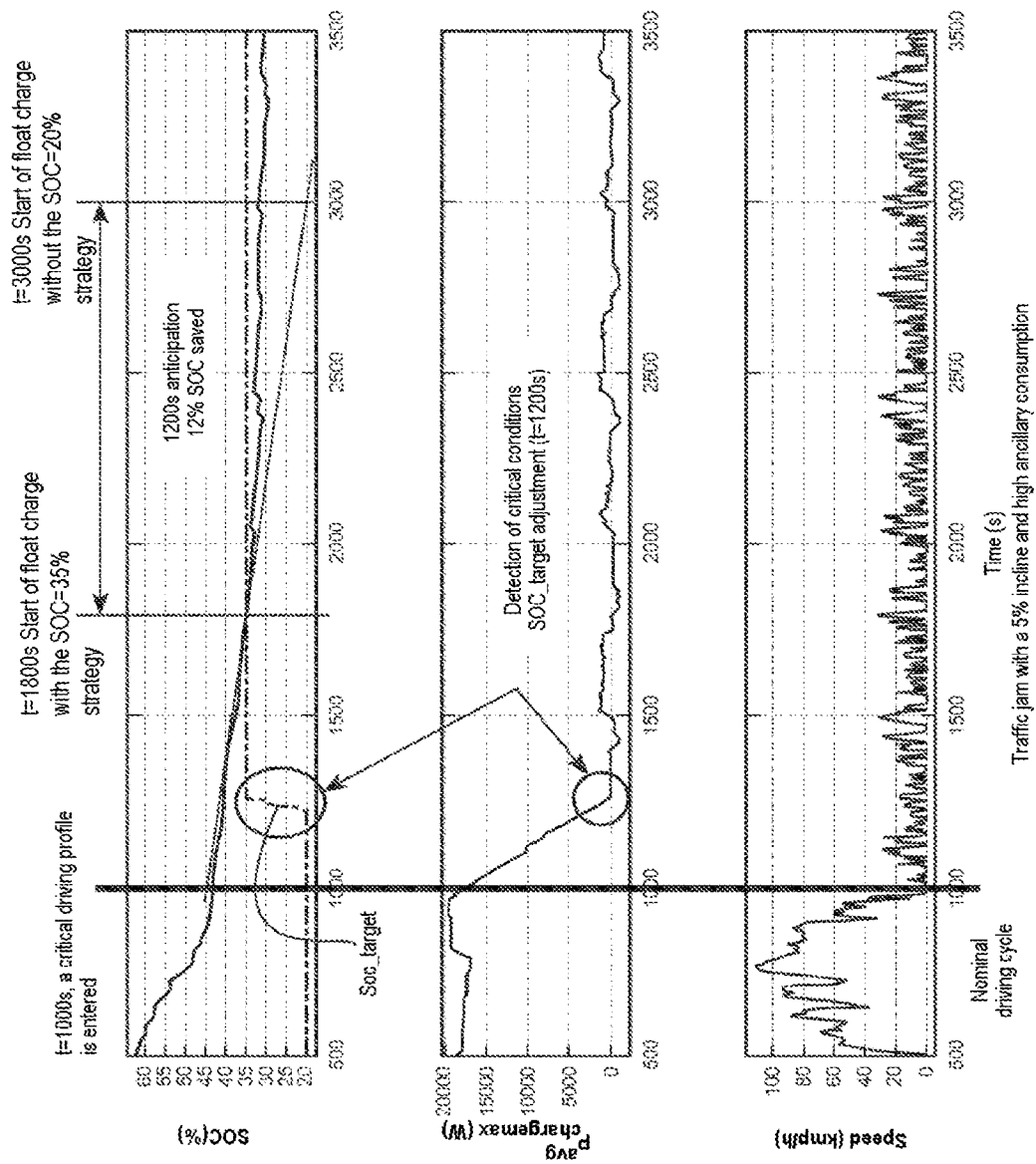

METHOD FOR MANAGING THE CHARGE STATE OF A TRACTION BATTERY OF A HYBRID VEHICLE

The present invention relates to a method for managing the state of charge of a battery including a step of activating a float-charge phase of the battery wherein the battery is intermittently charged with a view to maintaining the state of charge of the battery above a predetermined target value.

The invention preferably applies to a traction battery of a hybrid vehicle equipped with a hybrid powertrain, comprising an internal combustion engine and at least one electric machine for simultaneously or independently ensuring the transmission of a torque to the drive wheels of the vehicle. The invention applies in a non-limiting manner to a traction battery implemented in a hybrid powertrain architecture requiring, during a phase in which the vehicle is set into motion or a "take-off" phase from a standstill and at slow speeds of movement of the vehicle, that the power provided to the wheels be supplied exclusively from the traction battery of the vehicle. This is the case in certain architectures where, by design, the internal combustion engine can intervene in the propulsion of the vehicle only from a predetermined threshold vehicle speed, such that the powertrain has only the electrical energy stored in the traction battery of the vehicle to set into motion and move the vehicle up to said predetermined threshold vehicle speed at which the internal combustion engine can intervene.

In this "takeoff" phase, the internal combustion engine can neither participate in traction nor charge the battery. As a result, if the charge level of the traction battery drops too low, below a predefined threshold, the vehicle will have to be (temporarily) immobilized to activate a charging mode of the traction battery while the vehicle is at a standstill. However, in traffic jam type driving conditions or when climbing a hill at slow speed (in the snow), it may become difficult to maintain the state of charge of the battery above the threshold allowing it to provide the required minimum power level. The contribution of the electrical accessories will also be an aggravating factor likely to accelerate the discharge of the traction battery. Finally, temperature is also a factor to consider, insofar as it affects the electrical energy actually available for traction.

In some cases of use, the energy management law applied by the dedicated battery management computer thus does not allow the battery to be maintained in conditions that will allow it to ensure the required minimum power level. The vehicle then potentially faces temporary immobilization, wherein the traction battery is unable to supply the traction power required to make the vehicle take-off from a standstill and at low traveling speeds of the vehicle.

Patent document FR2992274, in the name of the applicant, discloses a method of controlling the charge of a hybrid vehicle traction battery equipped with a hybrid powertrain having the limitations as set forth above, this method providing that, in the event of the forced stoppage of the vehicle, the internal combustion engine drives the electric machine operating in generator mode to charge the battery while vehicle start-up is purely and simply denied as long as the state of charge of the battery has not returned to above the threshold allowing it to supply the required minimum power level.

A disadvantage of this system is that the vehicle is immobilized until the performance characteristics of the traction battery are restored, in other words until the latter returns to state-of-charge and temperature conditions allowing it to supply the required minimum power level.

Thus, there is a need to be able to limit, as much as possible, cases occurring where the vehicle is immobilized to recharge the traction battery at a standstill.

This goal is achieved through a method for managing the state of charge of a battery comprising a step of activating a float-charge phase of the battery, wherein the battery is intermittently charged with a view to maintaining the state of charge of the battery above a predetermined target state of charge value, the method being characterized in that it comprises the steps of:
  detection of critical conditions of use of the battery likely to prevent the state of charge of the battery from being maintained above the predetermined target state of charge value; and
  increasing the predetermined target state of charge value when the critical conditions of use of the battery are detected, so as to anticipate the step of activating the battery float-charge phase.

The battery being a traction battery of a hybrid vehicle comprising an internal combustion engine and an electrical machine, the step of detecting the critical conditions of use of the battery advantageously comprises:
  a step of estimating the maximum charging power that it would be possible to supply to the battery considering the current driving conditions of the vehicle and the electrical energy supplied by the traction battery to power the on-board low-voltage electrical system of the vehicle, and
  comparison of the estimated maximum charging power with a predefined power detection threshold of the critical conditions of use of the battery.

Advantageously, the estimate of the maximum charging power that it would be possible to supply to the battery comprises the following calculation:

$$P_{chargemax}(t) = \min((\overline{P_{eng}}(t) - P_{GMT}(t)) \times \eta_{ME} + P_{dcdc}(t), Pbat_{max})$$

where $P_{chargemax}(t)$ is the estimate of the maximum charging power that it would be possible to supply to the battery,
$\overline{P_{eng}}(t)$ is the maximum mechanical power that the internal combustion engine can supply;
$Pbat_{max}$ is the maximum charging power authorized for the battery;
$P_{dcdc}(t)$ is the power consumed by a DC/DC converter used to allow the low-voltage on-board network of the vehicle to be supplied from the energy drawn on the traction battery;
$P_{GMT}(t)$ is the mechanical power required for traction; and
$\eta_{ME}$ is the efficiency of the electrical machine.

Preferably, the estimate of the maximum charging power is an averaged value derived from average values of a set of instantaneous values of $P_{dcdc}(t)$ and $P_{GMT}(t)$ respectively, acquired over a sliding time window.

Advantageously, the sliding time window has a duration of the order of 300 s.

Preferably, the step of increasing the predetermined target state of charge value can include determining a target autonomy value of the vehicle in all-electric mode, the estimate of an electric energy value required to ensure the target autonomy in the current conditions of use of the vehicle and the conversion of the required electric energy value into a state of charge value by using a conversion factor that takes the temperature and the aging of the battery into account.

A computer program product is further proposed comprising instructions for performing the steps of the method described above when this program is run by a processor.

The method described above can then be implemented by digital processing means, such as a microprocessor, a microcontroller or the like.

A device for managing the state of charge of a battery is further proposed comprising battery control means for activating battery charging means designed to charge the battery in an intermittent manner in order to maintain the state of charge of the battery above a predetermined target state of charge value, said device being characterized in that said control means are able to detect critical conditions of use of the battery likely to prevent the state of charge of the battery from being maintained above the predetermined target state of charge value and to command an increase of the predetermined target state of charge value when the critical conditions of use are detected, so as to anticipate the activation of the charging means of the battery.

A hybrid motor vehicle is further proposed comprising a traction battery and a management device as described above.

Other features and advantages of the invention will become apparent upon reading the following description of a particular embodiment of the invention, given as a non-limiting indication, with reference to the single appended FIGURE illustrating, with regard to the evolution of the vehicle speed over time, the change in the average value of the estimate of the maximum theoretical charging power available for the battery used to determine the critical conditions of use and that of the state of charge of the battery (SOC).

The following description is given with reference to a hybrid vehicle equipped with a hybrid powertrain comprising an internal combustion engine and at least one electric motor, where the "takeoff" phase of the vehicle while the vehicle is at a standstill and at low speeds (approximately 0 to 15 km/h) is ensured by the electric motor and via the electrical power from the traction battery. In order to be able to ensure the capacity of the battery to supply the energy required for traction, particularly that required for vehicle take-off without prior immobilization for charging at a standstill, the method of the invention provides for detecting critical conditions of use prejudicial to maintaining the state of charge of the battery in order to be able to activate, as required, a dedicated mode for preserving the electric energy of the battery.

To do this, a certain number of variables, already available in the vehicle, are required, including:
- the vehicle speed: $v_{veh}(t)$;
- the power consumed by the DC/DC converter: $P_{dcdc}(t)$ (the DC/DC converter is conventionally used to make it possible to supply, from the energy drawn on the traction battery, the on-board low-voltage electrical system of the vehicle (14 VDC), on which an electrical power is available and consumed by the various electrical loads installed on board the vehicle and electrically connected to the onboard electrical system);
- the power supplied by the powertrain to the wheel, corresponding to the product of the torque demand at the wheel expressed by the driver (via the accelerator) and the rotation speed of the wheel: $P_{GMT}(t)=T_{GMT}(t)\times \omega_{wheel}(t)$
- an estimate of the maximum charging power that it would be possible to supply to the battery. This value is calculated as follows:

$$P_{chargemax}(t)=\min((\overline{P_{eng}}(t)-P_{GMT}(t))\times \eta_{ME}+P_{dcdc}(t), Pbat_{max}) \quad (1)$$

with the following convention: a positive electrical power is a load power of the battery.

$\overline{P_{eng}}(t)$ is the maximum mechanical power that the internal combustion engine can supply in the most favorable gear ratio. By calculating the engine speed on all existing ratios, its maximum torque on each ratio can be estimated, the product of the maximum torque and the speed giving the maximum power of the engine on each ratio, $\overline{P_{eng}}(t)$ being given by the highest power obtained on all the ratios.

$Pbat_{max}$ is the maximum charging power authorized for the battery and the electric machine, this value is thus a consolidation of the performance levels that the machine can reach and the battery limitations calculated by the BMS (Battery Management System).

In the expression (1) above, we begin from the maximum mechanical power that the engine can supply $\overline{P_{eng}}(t)$ and we subtract $P_{GMT}(t)$, namely the mechanical power required for traction. The remaining mechanical power (if any) is converted to electrical power via an estimated machine efficiency given by $\eta_{ME}$. From the electrical power obtained, we subtract $P_{dcdc}(t)$, the electrical power that is drawn by the DC/DC converter. The resulting electrical power is reduced by $Pbat_{max}$, the maximum power that can be sent to the battery.

Two distinct cases of use of the vehicle will be described below to illustrate the utility of the previous calculation for estimating the maximum charging power that it would be possible to supply to the battery.

A first use case concerns a phase of driving the vehicle at a constant speed of 50 km/h. In this case, $P_{GMT}(t)$ can be estimated at a low value, 10 kW for example. The value $\overline{P_{eng}}(t)$ can be estimated at a high value. The maximum power of the engine being considered as equal to 80 kW for example, $\overline{P_{eng}}(t)$ can then be estimated at 60 kW. $P_{dcdc}(t)$ is set at an average value, equal to −500 W, for example, and $\eta_{ME}$ is set at 80%.

In these conditions, the maximum theoretical charging power can be estimated at (60−10)*0.8−0.5=39.5 kW.

Nevertheless, in practice, the maximum charging power authorized for the battery is lower, equal to 20 kW for example. Thus, the maximum charging power that it would be possible to supply to the battery $P_{chargemax}(t)$ is ultimately estimated at 20 kW in this use case. This result reflects the fact that, if desired, 20 kW could be transferred to the battery. This does not mean that it is the command that will be applied to the vehicle. In contrast, considering the level of power that could be transferred to the battery, it can be considered that if the entire route of the vehicle takes place in these conditions of use, the probability of not being able to maintain the state of charge of the battery is zero.

Now let's examine a second case of use concerning a take-off phase of the vehicle, for example at 5 km/h. In this case, $P_{GMT}(t)$ will depend on the acceleration requested by the driver, but it can reach 15 kW, for example, on a frank takeoff. However, in this case of use, $\overline{P_{eng}}(t)$ is zero, since, as explained above, the internal combustion engine cannot participate in the traction at this speed. The same values are retained for $P_{dcdc}(t)$ and $\eta_{ME}$ as those set for the first case of use, namely $P_{dcdc}(t)=-500$ W and $\eta_{ME}=80\%$. However, in this case of use, the electric machine will operate in traction and will thus consume electric energy and no longer produce it, so that its actual yield reverses to 1/80%.

In these conditions, the maximum theoretical charging power can be estimated at (0−15)*(1/0.8)−0.5=−19.25 kW. Here, the maximum charging power is negative corresponding in fact to a discharge power. This illustrates the fact that in these conditions of use, and despite any desire to recharge the battery, discharge of the battery to −19.25 kW is inevitable. One can therefore imagine that along a route having many takeoffs, and along which the speed rarely exceeds 15 km/h, a speed at which the internal combustion engine can be used, there is a real probability of not being able to maintain the state of charge of the battery.

According to an embodiment, in order to "extrapolate" the instantaneous values of the variables described above for characterizing conditions critical to maintaining the state of charge of the battery, the sliding average method is used on a passed time window. The instantaneous values of the variables obtained in a sliding time window are thus averaged to determine a filtered signal therefrom. The length of the sliding time window is a calibration parameter of the strategy for preserving the state of charge of the battery, the order of magnitude of which is 300 s, for example. The drawback in using the sliding average is that it requires that all the elements making up the averaged sample be saved in memory. The variables used are, for example, acquired at a sampling frequency of 1 Hz, so that for a time window of 300 s, each variable must store 300 values. The RAM memory need is consequently adapted in the computer implementing the strategy for preserving the state of charge of the battery.

Thus, according to this embodiment, their averaged value is deduced from the instantaneous values of the four variables acquired as described above:
the average speed of the vehicle: $v_{veh}^{avg}(t)$;
the average power consumed by the DC/DC converter: $P_{dcdc}^{avg}(t)$;
the average power supplied by the powertrain to the wheel $P_{PT}^{avg}(t)$;
the maximum average charging power: $P_{chargemax}^{avg}(t)$.

The maximum average charging power is the variable that will be used to determine whether or not the conditions of use are critical to maintaining the state of charge of the battery. For example, if, on average, over the duration of the sliding temporal window, i.e. over the last 300 seconds of running according to the example given above, the estimated maximum average charging power is:
>>0, then, in these conditions, there is no reason to consider the risk of not being able to maintain the state of charge of the battery.
close to 0, the risk of not being able to maintain the state of charge of the battery is to be considered.
<0, there is a real risk of not being able to maintain the state of charge.

The power detection thresholds of critical conditions of use for the value of $P_{chargemax}^{avg}(t)$, and the hystereses to avoid them, are advantageously calibration parameters of the strategy for preserving the state of charge of the battery.

If the conditions of use are not considered critical, the target state of charge value of the battery considered by the energy management law remains constant (of the order of 20%, for example), in order to promote repeatability. In the case of detection of critical conditions of use, the strategy for preserving the state of charge is thus activated, and a step for increasing the target state of charge value is implemented. More precisely, the increased target state of charge value is calculated as follows: Firstly, a target autonomy is determined, noted as $Autonomy_{target}$, that we want to guarantee for the vehicle in all-electric mode (autonomy in ZEV, "Zero Emission Vehicle," mode), in the order of 5 km, for example.

The energy required to ensure this target autonomy is estimated in the current conditions of use of the vehicle:

$$Energy_{target}(t) = \left[\frac{1}{\eta_{ME}} \cdot P_{PT}^{avg}(t) + P_{dcdc}^{avg(t)}\right] \times \frac{Autonomy_{target}}{v_{veh}^{avg}(t)}$$

where:

$$\frac{1}{\eta_{ME}} \cdot P_{PT}^{avg}(t)$$

is the average electrical power required for traction; $P_{dcdc}^{avg}(t)$ is the average electrical power consumed by the DC/DC converter, and the quotient $$\frac{Autonomy_{target}}{v_{veh}^{avg}(t)}$$

expresses the duration required to cover the target autonomy.

Then, the estimated target energy, expressed in W/h, is translated into a percentage of target state of charge SOC_target, based on the conversion factor provided by the BMS and which takes the temperature and aging of the battery into account. Finally, the target state of charge value thus determined is limited between fixed minimum and maximum values.

It should be noted that when the conditions of use are not considered to be critical, an increase in the maximum average charging power $P_{chargemax}^{avg}(t)$ is noted, leading to deactivation of the strategy for preserving the state of charge of the battery, and the target state of charge value will then return to its initial constant value.

The single appended FIGURE shows the advantages of implementing the strategy for preserving the state of charge of the battery as described above. FIG. 1 shows the speed curve of the vehicle as a function of the time according to a scenario comprising a first phase of normal driving followed by a second traffic jam phase with a 5% incline and high consumption of the electrical accessories of the vehicle and, in parallel, the curve of the maximum average charging power as estimated according to the principles outlined above and that of the state of charge of the battery (SOC).

The scenario, illustrated as an example in the FIGURE, starts with a conventional driving phase in extra-urban conditions, the initial state of charge is 65%; the vehicle is thus moving in ZEV mode, and the internal combustion engine is not used. As illustrated, at t=1000 s, the vehicle enters a traffic jam phase on an incline. The estimate of the battery charging potential, calculated by the strategy for preserving the state of charge based on the maximum charging power that it would be possible to supply to the battery in these conditions of use, then begins to drop and it closely approaches 0 at around t=1200 s. Consequently, the detection of these critical conditions triggers the activation of the strategy for preserving the state of charge. In accordance with the principles outlined above, the target state of charge value of the battery SOC_target, initially set at 20% according to the example in the FIGURE, is increased from 20 to 35%. At t=1800 s, the state of charge of the battery falls below the target state of charge value SOC_target, the vehicle exits ZEV mode driving and the strategy commands the start of maintaining the state of charge of the battery. The internal combustion engine thus starts and, when it can (vehicle speed>15 km/h), drives the electric machine operating in regenerative mode to charge the battery. As shown in the FIGURE, battery charging is not however sufficient to ensure that the state of charge of the battery is perfectly maintained in relation to the increased target state of charge value, and the state of charge of the battery decreases slowly. However, considering the dotted line, which represents an extrapolation of the change in the state of charge of the battery without implementation of the strategy, i.e. if the target state of charge value had remained at its initial value of 20% and the vehicle had not switched over to the float charge, it can be estimated that the state of charge of the battery would have reached the value of 20% at approximately t=3000 s and it is at this time only that the float charge of the battery would have been activated. Thus, this example shows that the strategy according to the invention, owing to the increase in the target state of charge value when conditions critical to maintaining the state of charge of the battery are detected, makes it possible to anticipate the activation of the maintenance of the state of charge of the battery by approximately 1200 s and thus preserve the state of charge of the battery. According to this example, at t=3000 s, the state of charge of the battery, when the strategy of the invention is implemented, is greater by approximately 12% than that which the battery would have had without the use of said strategy. This margin will advantageously allow the implementation of the battery charging phase to be delayed, as discussed in patent document FR2992274 cited above.

In addition, when the traffic jam phase is finished, the maximum charging power $P_{chargemax}^{avg}(t)$ will increase until it exceeds the predefined power detection threshold of the critical conditions of use, where the target state of charge value will return to its nominal value of 20% according to the example and where the electric power will be consumed again.

The calculation means implemented to estimate the maximum charging power $P_{chargemax}^{avg}(t)$ to be compared with a predefined power detection threshold in critical conditions of use for the activation of the strategy for preserving the state of charge of the battery, are implemented by a computer onboard the vehicle, for example a computer adapted to control the powertrain of the vehicle as a whole.

The invention claimed is:

1. A method for managing a state of charge of a battery including an activation of a float-charge phase of the battery, wherein the battery is intermittently charged with a view to maintaining the state of charge of the battery above a predetermined target state of charge value, the method comprising:

determining whether critical conditions of use of the battery preventing the state of charge of the battery from being maintained above the predetermined target state of charge value are detected, the determining including estimating a maximum charging power to supply to the battery based on current driving conditions of a vehicle and electrical energy supplied by the battery to power an on-board low-voltage electrical system of the vehicle, and comparing the estimated maximum charging power with a predefined power threshold of the critical conditions of use of the battery;

increasing the predetermined target state of charge value, when the critical conditions of use of the battery are detected;

maintaining the state of charge of the battery above the predetermined target state of charge value by activating the battery float-charge phase; and maintaining the predetermined target state of charge value at a constant value, when the critical conditions of use of the battery are not detected, wherein the estimating of the maximum charging power is based on a maximum mechanical power of the internal combustion engine, a maximum battery charging power, a power consumed by a DC/DC converter for the low-voltage electrical system of the vehicle to be supplied from energy taken on the battery, a mechanical power for traction, and an efficiency of an electrical machine.

2. The method as claimed in claim 1, wherein the estimating of the maximum charging power is based on average values of a set of instantaneous values of $P_{dcdc}(t)$, which is the power consumed by the DC/DC converter, and $P_{GMT}(t)$, which is the mechanical power for traction, respectively, acquired over a sliding time window.

3. The method as claimed in claim 2, wherein the sliding time window has a duration on an order of 300 s.

4. The method as claimed in claim 1, wherein the increasing the predetermined target state of charge value includes determining a target autonomy value of the vehicle in all-electric mode, estimating an electric energy value for the target autonomy value of the vehicle in a current driving condition, and converting the electric energy value into the predetermined target state of charge value based on a conversion factor including a temperature and an aging of the battery.

5. The method as claimed in claim 1, wherein the determining detects the critical conditions when an average of the estimated maximum charging power acquired over a sliding time window is zero or less than zero, the sliding time window having a duration on an order of 300 s.

6. A method for managing a state of charge of a battery including an activation of a float-charge phase of the battery, wherein the battery is intermittently charged with a view to maintaining the state of charge of the battery above a predetermined target state of charge value, the method comprising:

detecting critical conditions of use of the battery preventing the state of charge of the battery from being maintained above the predetermined target state of charge value, the detecting of the critical conditions of use of the battery including estimating a maximum charging power to supply to the battery based on current driving conditions of a vehicle and electrical energy supplied by the battery to power an on-board low-voltage electrical system of the vehicle, and comparing the estimated maximum charging power with a predefined power threshold of the critical conditions of use of the battery;

increasing the predetermined target state of charge value, when the critical conditions of use of the battery are detected; and maintaining the state of charge of the battery above the predetermined target state of charge value by activating the battery float-charge phase, wherein the estimating of the maximum charging power is based on a maximum mechanical power of the internal combustion engine, a maximum battery charging power, a power consumed by a DC/DC converter for the low-voltage electrical system of the vehicle to be supplied from energy taken on the battery, a mechanical power for traction, and an efficiency of an electrical machine, wherein the estimating of the maximum charging power is based on a calculation:

$$P_{chargemax}(t)=(\overline{P}_{eng}(t)-P_{GMT}(t))\times\eta_{ME}-P_{dcdc}(t)-Pbat_{max},$$

wherein
$P_{chargemax}(t)$ is the estimated maximum charging power,
$\overline{P}_{eng}(t)$ is a maximum mechanical power of the internal combustion engine,
$Pbat_{max}$ is a maximum battery charging power,
$P_{dcdc}(t)$ is power consumed by a DC/DC converter,
$P_{GMT}(t)$ is the mechanical power for traction, and
$\eta_{ME}$ is the efficiency of the electrical machine.

7. A device for managing a state of charge of a battery, comprising:
processing circuitry configured to
activate a charging of the battery in an intermittent manner to maintain the state of charge of the battery above a predetermined target state of charge value,
determine whether critical conditions of use of the battery preventing the state of charge of the battery from being maintained above the predetermined target state of charge value are detected, by estimating a maximum charging power to supply to the battery based on current driving conditions of a vehicle and electrical energy supplied by the battery to power an on-board low-voltage electrical system of the vehicle, and comparing the estimated maximum charging power with a predefined power threshold of the critical conditions of use of the battery,
increase the predetermined target state of charge value when the critical conditions of use are detected, and
maintain the predetermined target state of charge value at a constant value, when the critical conditions of use of the battery are not detected,
wherein the processing circuitry is further configured to estimate the maximum charging power based on a maximum mechanical power of the internal combustion engine, a maximum battery charging power, a power consumed by a DC/DC converter for the low-voltage electrical system of the vehicle to be supplied from energy taken on the battery, a mechanical power for traction, and an efficiency of an electrical machine.

8. A hybrid motor vehicle, comprising:
the battery; and
the device for managing the state of charge of the battery as claimed in claim 7.

* * * * *